(12) United States Patent
Han et al.

(10) Patent No.: US 11,959,693 B2
(45) Date of Patent: Apr. 16, 2024

(54) VACUUM ADIABATIC BODY AND REFRIGERATOR

(71) Applicant: LG ELECTRONICS INC., Seoul (KR)

(72) Inventors: Sol Han, Seoul (KR); Hyeunsik Nam, Seoul (KR); Wonyeong Jung, Seoul (KR); Deokhyun Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 728 days.

(21) Appl. No.: 17/043,333

(22) PCT Filed: Jun. 26, 2019

(86) PCT No.: PCT/KR2019/007764
§ 371 (c)(1),
(2) Date: Sep. 29, 2020

(87) PCT Pub. No.: WO2020/004956
PCT Pub. Date: Jan. 2, 2020

(65) Prior Publication Data
US 2021/0025645 A1    Jan. 28, 2021

(30) Foreign Application Priority Data

Jun. 27, 2018 (KR) ........................ 10-2018-0074190

(51) Int. Cl.
*F25D 11/02* (2006.01)
*F16L 59/02* (2006.01)
(Continued)

(52) U.S. Cl.
CPC ............ *F25D 23/065* (2013.01); *F16L 59/02* (2013.01); *F16L 59/065* (2013.01); *F25D 11/02* (2013.01);
(Continued)

(58) Field of Classification Search
CPC ......... F16L 59/02; F16L 59/065; F25D 11/02; F25D 2201/00; F25D 2201/14;
(Continued)

(56) References Cited

U.S. PATENT DOCUMENTS 3,161,265 A * 12/1964 Matsch ................... E04B 1/803
52/794.1
3,338,451 A *  8/1967 Kesling ................. F25D 23/082
220/592.08

(Continued)

FOREIGN PATENT DOCUMENTS

JP    2014-145371    8/2014
KR    10-0343719    6/2002
(Continued)

OTHER PUBLICATIONS

International Search Report and Written Opinion dated Sep. 27, 2019 issued in Application No. PCT/KR2019/007764.

*Primary Examiner* — Filip Zec
(74) *Attorney, Agent, or Firm* — KED & ASSOCIATES, LLP

(57) ABSTRACT

A vacuum adiabatic body includes a first plate configured to define at least a portion of a wall for a first space, a second plate configured to define at least a portion of a wall for a second space having a temperature different from that of the first space, and a support configured to maintain the third space. The support includes a coupling mechanism by which a first support plate and a second support plate are coupled to each other and integrated with each other and a seating mechanism configured to maintain a gap between the first support plate and the second support plate at points at which the first support plate and the second support plate contact each other. The seating mechanisms are spaced apart from the coupling mechanism.

19 Claims, 12 Drawing Sheets

(51) Int. Cl.
*F16L 59/065* (2006.01)
*F25D 23/06* (2006.01)

(52) U.S. Cl.
CPC ...... *F25D 2201/00* (2013.01); *F25D 2201/14* (2013.01); *F25D 2317/043* (2013.01)

(58) Field of Classification Search
CPC .... F25D 23/063; F25D 23/065; F25D 23/085; F25D 2317/043
See application file for complete search history.

(56) References Cited

U.S. PATENT DOCUMENTS

| | | | | |
|---|---|---|---|---|
| 4,496,072 | A * | 1/1985 | Fleck | F25D 23/082 220/592.06 |
| 5,157,893 | A * | 10/1992 | Benson | B64G 1/22 52/789.1 |
| 5,168,674 | A * | 12/1992 | Molthen | E04B 1/803 52/592.1 |
| 6,038,830 | A * | 3/2000 | Hirath | F16L 59/065 428/69 |
| 8,137,784 | B2 * | 3/2012 | Veltkamp | E04B 1/803 52/794.1 |
| 8,910,453 | B2 * | 12/2014 | Jones | E06B 3/67326 52/204.593 |
| 9,157,230 | B2 * | 10/2015 | Feinerman | B23K 26/037 |
| 11,466,926 | B2 * | 10/2022 | Bae | B32B 27/365 |
| 2004/0226956 | A1 | 11/2004 | Brooks | |
| 2006/0207212 | A1 | 9/2006 | Durney | |
| 2010/0251653 | A1 * | 10/2010 | Mills | B64G 1/50 52/506.05 |
| 2012/0128920 | A1 | 5/2012 | Yoon et al. | |
| 2013/0105494 | A1 * | 5/2013 | Jung | F25D 23/062 220/592.05 |
| 2014/0322481 | A1 | 10/2014 | Song et al. | |
| 2015/0030800 | A1 | 1/2015 | Jung et al. | |
| 2015/0275989 | A1 | 10/2015 | Suzuki et al. | |
| 2017/0009960 | A1 | 1/2017 | Ahn et al. | |
| 2018/0224195 | A1 | 8/2018 | Jung et al. | |
| 2018/0224197 | A1 | 8/2018 | Jung et al. | |
| 2018/0231300 | A1 | 8/2018 | Jung et al. | |
| 2018/0356147 | A1 | 12/2018 | Jung et al. | |

FOREIGN PATENT DOCUMENTS

| | | |
|---|---|---|
| KR | 10-2011-0015327 | 2/2011 |
| KR | 10-2011-0057776 | 6/2011 |
| KR | 10-1456376 | 10/2014 |
| KR | 10-2015-0012712 | 2/2015 |
| KR | 10-2017-0005537 | 1/2017 |
| KR | 10-2017-0016244 | 2/2017 |
| KR | 10-1861830 | 5/2018 |
| KR | 10-2019-0018835 | 2/2019 |
| WO | WO 2017/023090 | 2/2017 |
| WO | WO 2017/023094 | 2/2017 |

* cited by examiner

[Fig. 1]
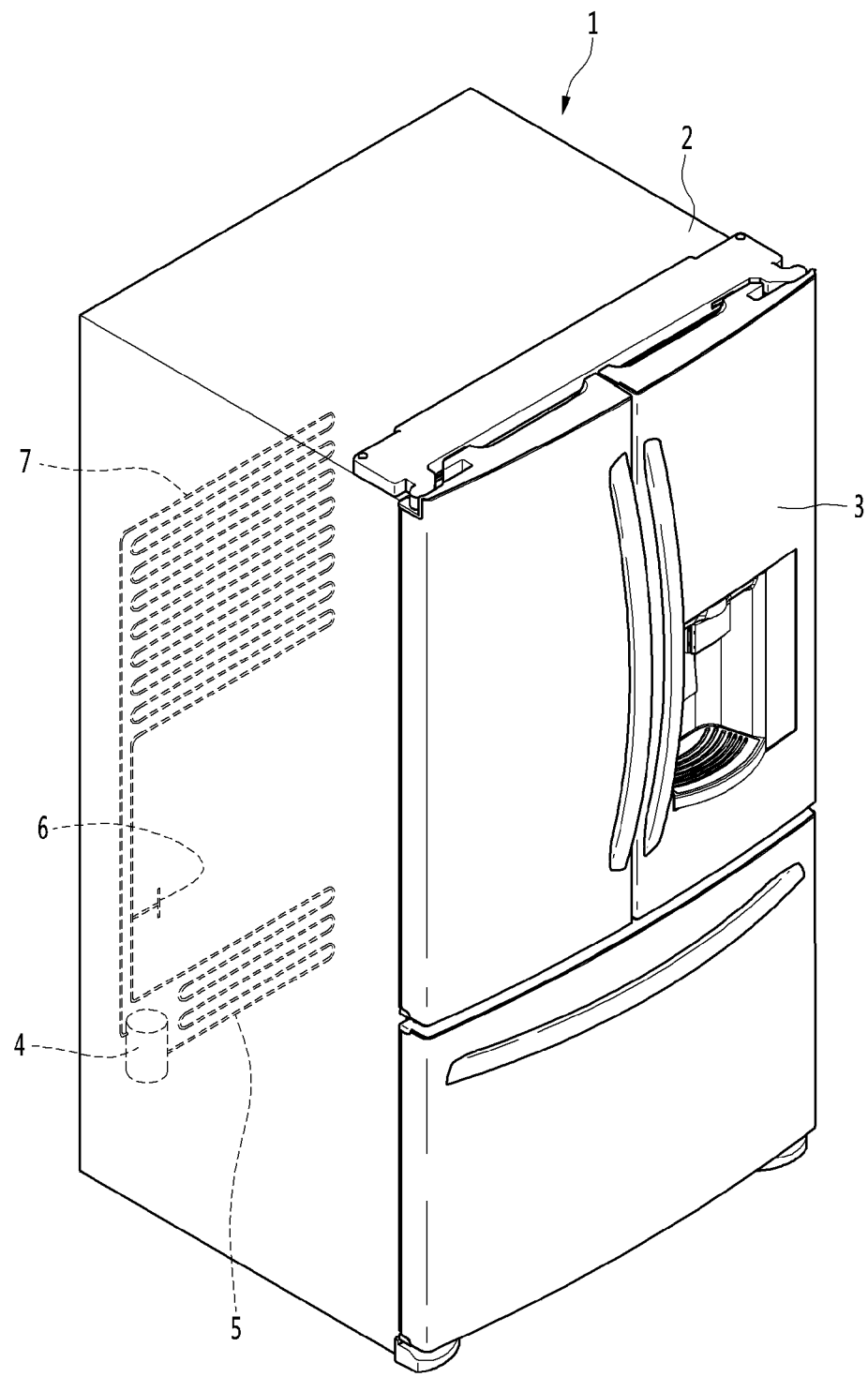

[Fig. 2]
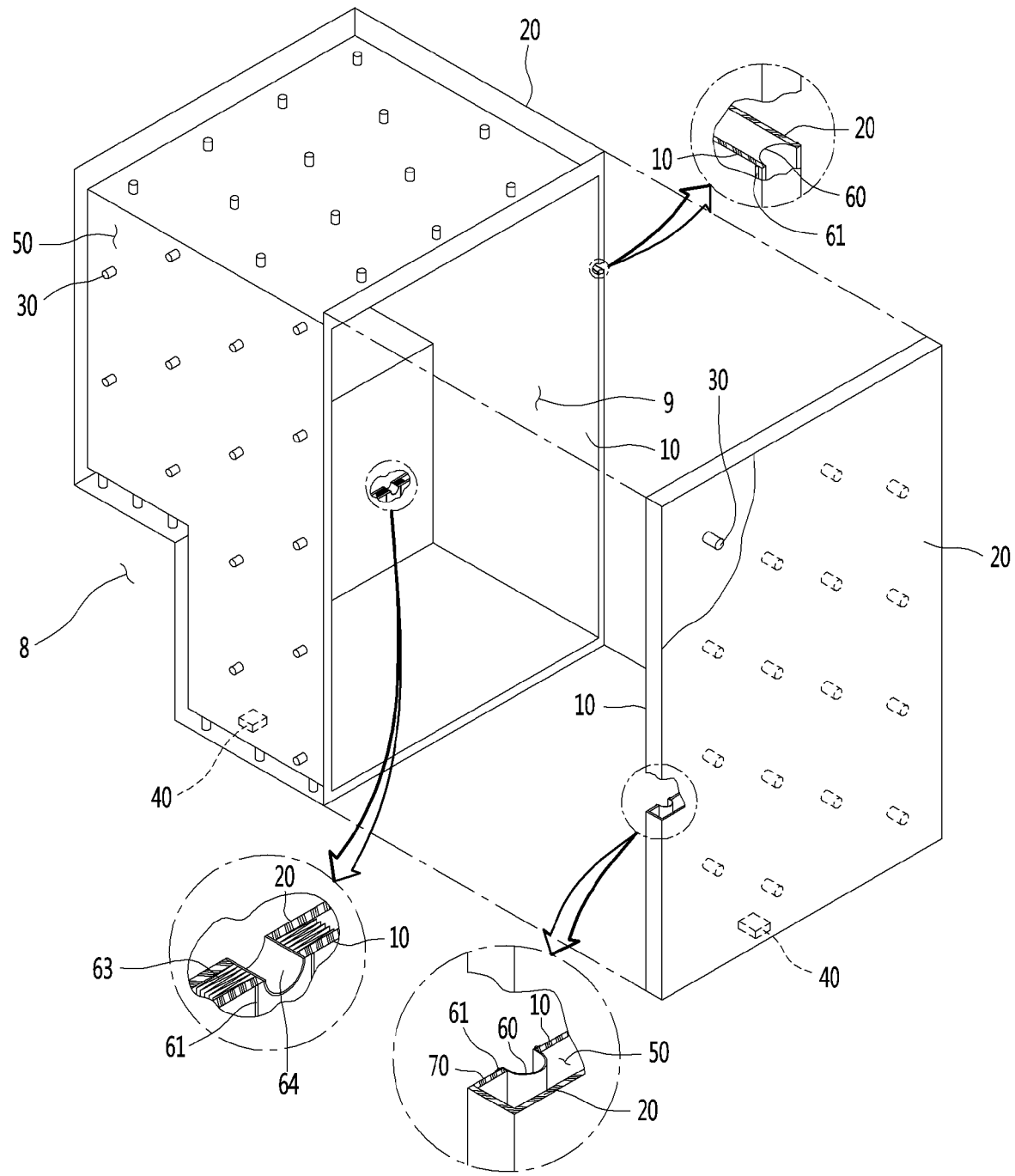

FIG. 4

| Group | General plastic | | | | Engineering plastic | | | |
|---|---|---|---|---|---|---|---|---|
| Material | (HD)PE *G-Plastic Reference | PC | Glass fiber PC (30% Glass-F) | *Low outgassing PC | PCTFE | PPS | LCP | PEEK |
| Out-gassing rate | TML(%) | 0.58 | 0.19 | 0.14 | No Data | 0.01 | 0.06 | 0.06 | 0.26 |
| Compressive Strength | MPa | 31.7 | 82.8 | 124.1 | *80.6 | 37.9 | 107.0 | *151.1 | 137.9 |
| Thermal Conductivity | W/m·k | <0.40 | 0.18 | 0.18 | 0.18 | 0.20 | 0.3 | 0.36 (G/F 50%) | 0.25 |
| Strength /Cond. | MPa·m·k/W | 79 | 460 | 689 | 448 | 189 | 357 | 420 | 552 |
| Heat Deflection Temp at 264 psi | °C | 80 | 132 | 146 | 125 | 126 | 121 | 105 ~ 260 | 160 |
| Max Operating Temperature | °C | 82 | 121 | 132 | No Data | 132 | 218 | No Data | 249 |
| *Cost(per 1kg) | | Low | $3.1 | $6.2(G/F20%) | $6.7 | High | $30 | $40 | $150 |

[Fig. 5]
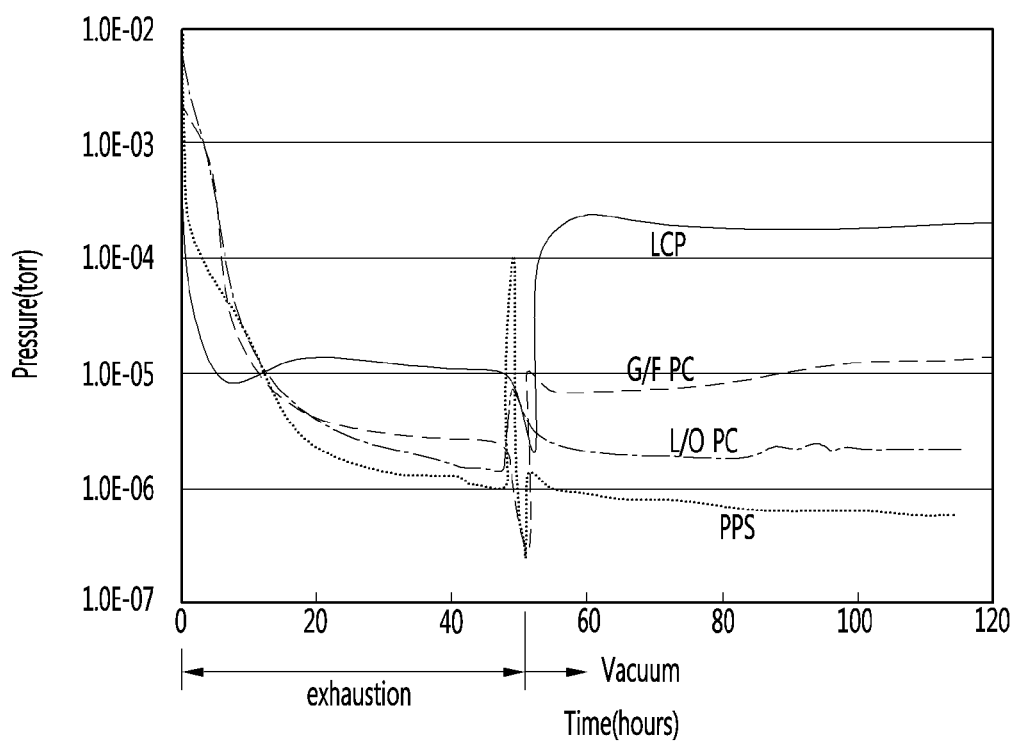

[Fig. 7]
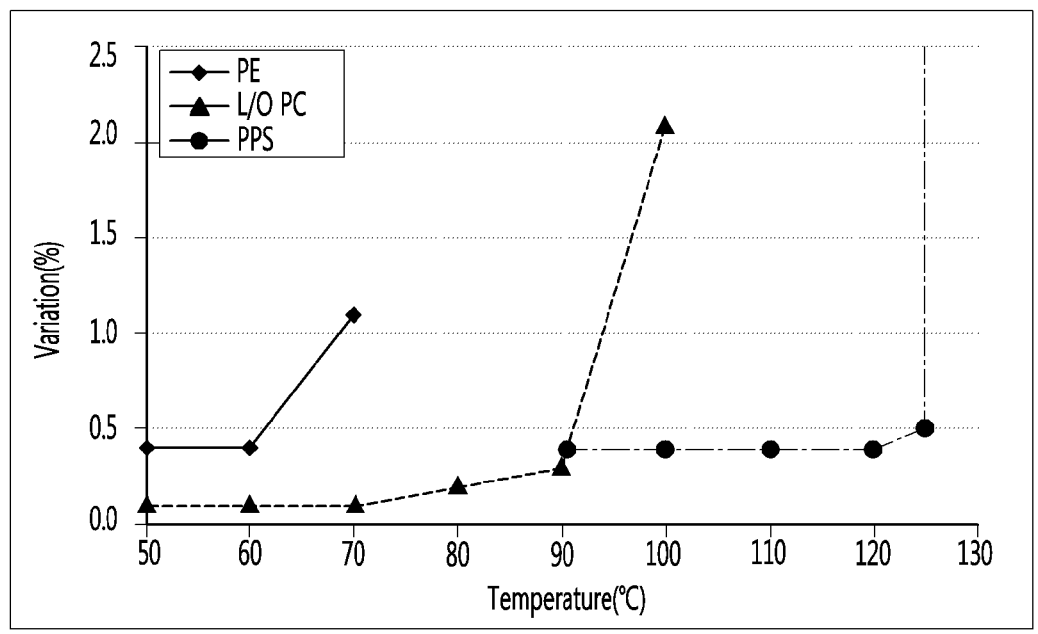

[Fig. 9]
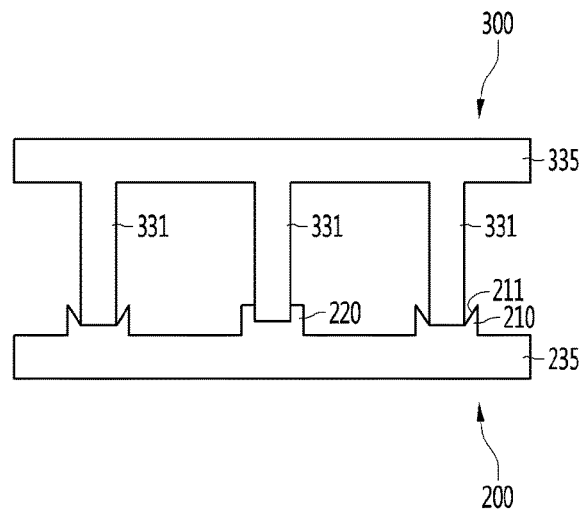
[Fig. 10]
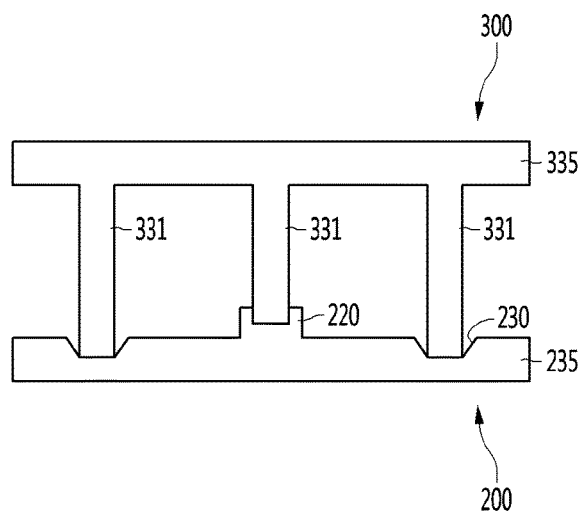
[Fig. 11]
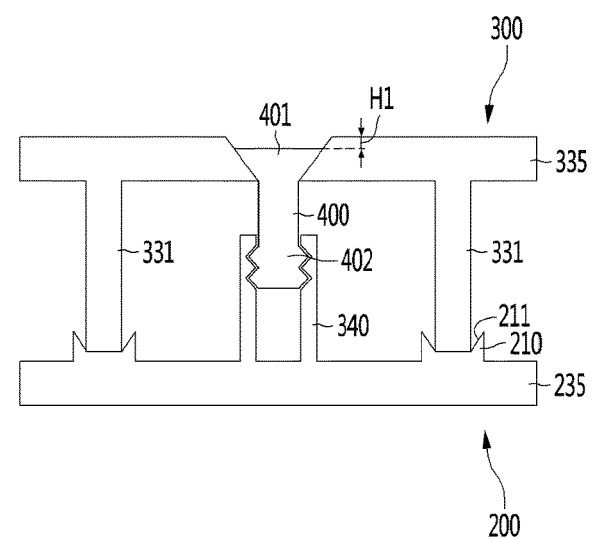

[Fig. 15]
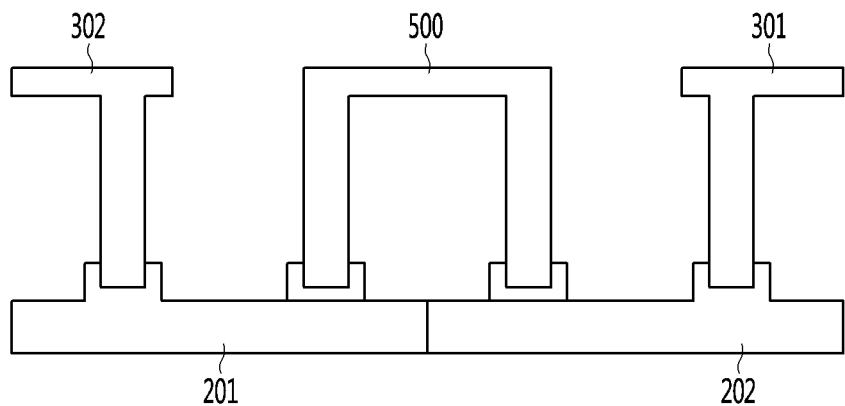
[Fig. 16]
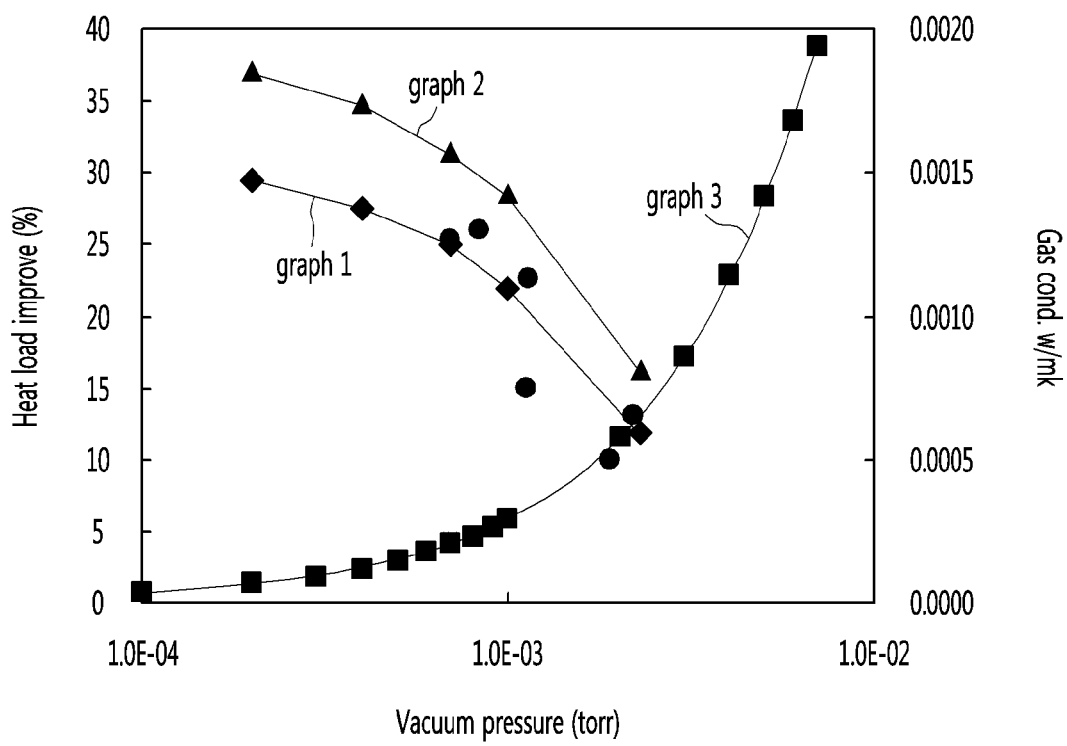

[Fig. 17]
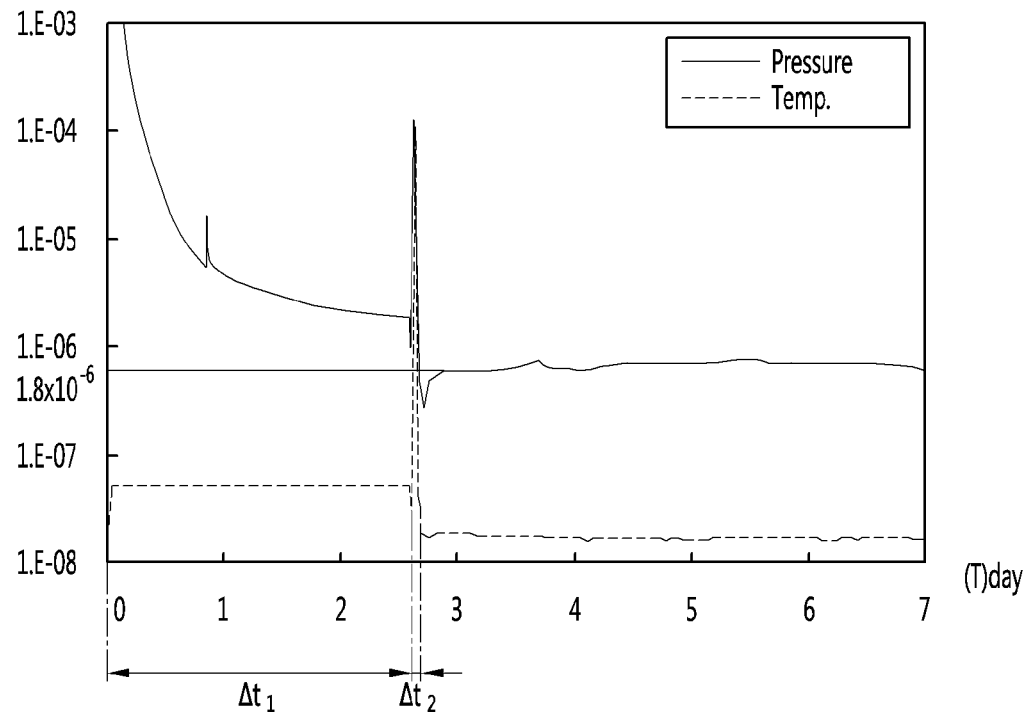
[Fig. 18]
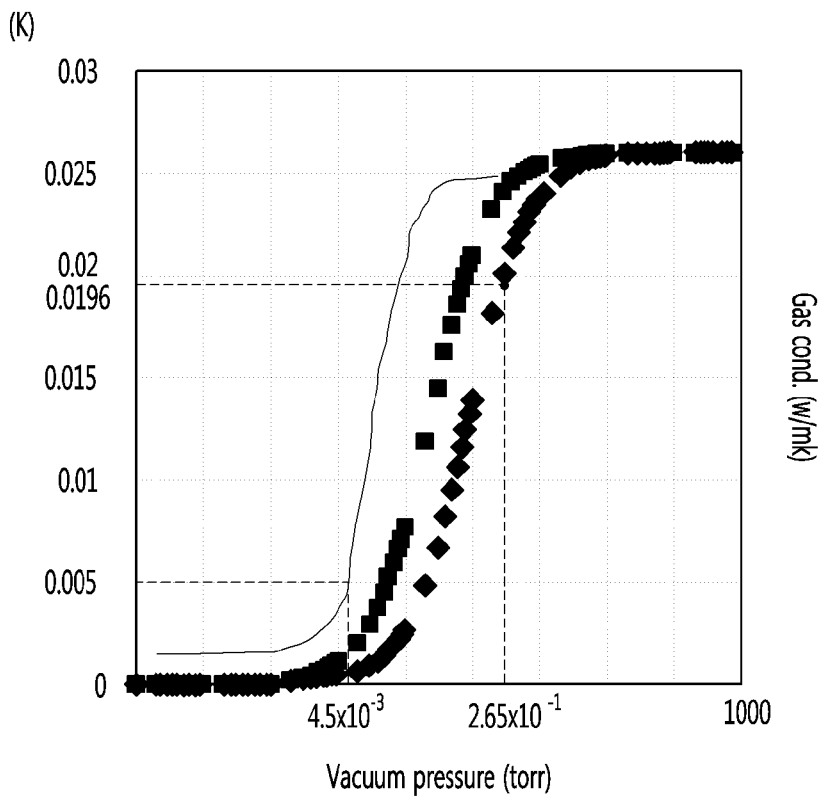

VACUUM ADIABATIC BODY AND REFRIGERATOR

CROSS-REFERENCE TO RELATED PATENT APPLICATIONS

This application is a U.S. National Stage Application under 35 U.S.C. § 371 of PCT Application No. PCT/KR2019/007764, filed Jun. 26, 2019, which claims priority to Korean Patent Application No.10-2018-0074190, filed Jun. 27, 2018, whose entire disclosures are hereby incorporated by reference.

TECHNICAL FIELD

The present disclosure relates to a vacuum adiabatic body and a refrigerator.

BACKGROUND ART

A vacuum adiabatic body may suppress heat transfer by vacuumizing the interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more may be provided. However, the internal volume of the refrigerator may therefore be reduced.

In order to increase the internal volume of a refrigerator, there is an attempt to apply a vacuum adiabatic body to the refrigerator.

First, Korean Patent No. 10-0343719 (Cited Document 1) of the present applicant has been disclosed. Reference Document 1 discloses a method in which a vacuum adiabatic panel is prepared and then built in walls of a refrigerator, and the exterior of the vacuum adiabatic panel is finished with a separate molding such as Styrofoam. According to the method, additional foaming is not required, and the adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Cited Document 2). According to Reference Document 2, fabrication cost is increased, and a fabrication method is complicated.

As further another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Publication No. US 2004/0226956 A1 (Cited Document 3). However, it is difficult to obtain a practical level of an adiabatic effect by providing a wall of the refrigerator with sufficient vacuum. It may be difficult to prevent a heat transfer phenomenon at a contact portion between an outer case and an inner case having different temperatures, to maintain a stable vacuum state, and to prevent deformation of a case due to a negative pressure of the vacuum state. Due to these limitations, the technology disclosed in Reference Document 3 is limited to a cryogenic refrigerator, and does not provide a level of technology applicable to general households.

The present applicant had filed Korean Patent Application No. 10-2015-0109727 (Cited Document 4) in consideration of the above-described limitations. In Cited Document 4, a refrigerator including a vacuum adiabatic body is proposed. Particularly, a resin material that is adequate for a material to form a supporting unit of the vacuum adiabatic body is proposed. A specific structure of the supporting unit made of the material disclosed in Cited Document 4 is proposed in Korean Patent Application No. 10-2017-0103444 (Cited Document 5).

The supporting unit disclosed in Cited Document 5 has an advantage in that it may be applied to variously sized refrigerators. However, there is a limitation in that a pair of facing support plates is not completely coupled and thus is pulled out and also is not inserted when being inserted into the vacuum adiabatic body. Also, there arises a limitation that a bar is broken while the pair of support plates are further coupled in a vacuum evacuation process. Particularly, when damage occurs in the supporting unit during the vacuum evacuation process, the corresponding vacuum adiabatic body may be discarded. Also, there is a limitation in that it is difficult for a worker to know a position to be coupled when the pair of support plates are coupled.

DISCLOSURE

Technical Problem

Embodiments provide a vacuum adiabatic body in which coupling positions of a pair of support plates to be coupled are easily confirmed.

Embodiments provide a vacuum adiabatic body in which a pair of support plates are more accurately coupled to prevent a supporting unit from being damaged by non-coupling and prevent the support pates from interfering when inserted into the vacuum adiabatic body.

Embodiments provide a vacuum adiabatic body in which a supporting unit is prevented from being unexpectedly broken in a vacuum evacuation process.

Technical Solution

In one embodiment, a vacuum adiabatic body may include a supporting unit or support configured to maintain a vacuum space part or gap, wherein the supporting unit may have a one-side or first support plate configured to support one of a first plate member and a second plate member; an other-side support plate configured to support the other of the first plate member and the second plate member, the other-side support plate contacting the one-side support plate at a plurality of points; coupling mechanisms configured to couple the one-side support plate to the other-side support plate to each other at the points at which the one-side support plate and the other-side support plate contact each other so that the one-side support plate and the other-side support plate are integrated with each other; and seating mechanisms configured to maintain a gap between the one-side support plate and the other-side support plate so that the one-side support plate and the other-side support plate are not integrated with each other at the points at which the one-side support plate and the other-side support plate contact each other. Thus, work may be convenient.

In another embodiment, a refrigerator may include a main body having an internal or storage space in which storage goods are stored; and a door provided so that the main body is openable from an external space. At least one of the door or the main body comprises a vacuum adiabatic body. The vacuum adiabatic body may have a supporting unit or support configured to maintain a vacuum space part or gap.

The supporting unit may include a one-side support plate configured to support one of the first plate member and the second plate member; the other-side support plate configured to support the other of the first plate member and the second plate member; coupling mechanisms configured to maintain a gap between the one-side support plate and the other-side support plate, the coupling mechanisms integrating the one-side support plate and the other-side support plate with each other; and seating mechanisms configured to allow the one-side support plate and the other-side support plate to be maintained at relative positions so that that the one-side support plate and the other-side support plate correspond to each other.

Thus, the supporting unit may be easily manufactured.

In further another embodiment, a vacuum adiabatic body may include a first plate member configured to define at least a portion of a wall for a first space; a second plate member configured to define at least a portion of a wall for a second space having a temperature different from that of the first space; a sealing part or seal configured to seal the first plate member and the second plate member so as to provide a third space that has a temperature between the temperature of the first space and the temperature of the second space and is a vacuum space; a supporting unit or support configured to maintain the third space; a heat resistance unit configured to reduce a heat transfer amount between the first plate member and the second plate member; and an exhaust port configured to discharge a gas within the third space. The supporting unit may include a one-side support plate configured to support one of the first plate member and the second plate member; the other-side support plate configured to support the other of the first plate member and the second plate member, the other-side support plate contacting the one-side support plate at a plurality of points; coupling mechanisms configured to couple the one-side support plate to the other-side support plate to each other at the points at which the one-side support plate and the other-side support plate contact each other; and seating mechanisms or bars configured to maintain a gap between the one-side support plate and the other-side support plate at the points at which the one-side support plate and the other-side support plate contact each other, the seating mechanisms being spaced apart from the coupling mechanisms.

Thus, the vacuum adiabatic body may be easily manufactured without damaging the vacuum adiabatic body.

Advantageous Effects

According to the embodiments, since the worker easily identifies the coupling positions of the support plates, which are vertically coupled, it may be advantageous in that the work is convenient.

According to the embodiments, the portion at which the coupling of the support plate is required and the portion at which the coupling of the support plate is not required may be distinguished, and the portion at which the coupling of the support plate is required may be selectively completely coupled to prevent the supporting unit from being damaged due to the non-coupling and prevent the coupled support unit from interfering when the supporting unit is inserted into the vacuum adiabatic body.

According to the embodiments, the damage of the bar while the bar is press-fitted in the vacuum evacuation process may be prevented to improve the reliability of the product for a long time and improve the productivity of the product.

DESCRIPTION OF DRAWINGS

FIG. 1 is a perspective view of a refrigerator according to an embodiment.

FIG. 2 is a view schematically showing a vacuum adiabatic body used in a main body and a door of the refrigerator.

FIG. 4 is a diagram illustrating results obtained by examining resins.

FIG. 5 illustrates results obtained by performing an experiment on vacuum maintenance performances of resins.

FIG. 7 illustrates results obtained by measuring maximum deformation temperatures at which resins are damaged by atmospheric pressure in high-temperature exhaustion.

FIG. 9 is a cross-sectional view of a supporting unit according to an embodiment.

FIG. 10 is a cross-sectional view of a supporting unit according to another embodiment.

FIG. 11 a cross-sectional view of the supporting unit when a coupling member is applied so that the support plate is coupled.

FIG. 15 is a view of a supporting unit according to another embodiment.

FIG. 16 illustrates graphs showing changes in adiabatic performance and changes in gas conductivity with respect to vacuum pressures by applying a simulation.

FIG. 17 is a graph illustrating results obtained by observing a time and a pressure in a process of exhausting the inside of the vacuum adiabatic body when a supporting unit is used.

FIG. 18 is a graph illustrating results obtained by comparing a vacuum pressure with gas conductivity.

MODE FOR INVENTION

Figure 3A:
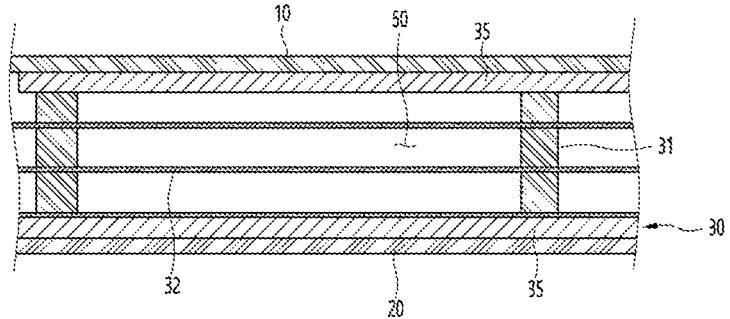
FIGS. 3A-3C are views illustrating various embodiments of an internal configuration of a vacuum space part.

Hereinafter, exemplary embodiments will be described with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

The drawings shown below may be displayed differently from the actual product, or exaggerated or simple or detailed parts may be deleted, but this is intended to facilitate understanding of the technical idea of the present invention. It should not be construed as limited.

In the following description, the vacuum pressure means any pressure state lower than the atmospheric pressure. In addition, the expression that a vacuum degree of A is higher than that of B means that a vacuum pressure of A is lower than that of B.

FIG. 1 is a perspective view of a refrigerator according to an embodiment.

Referring to FIG. 1, the refrigerator 1 may include a main body 2 provided with a cavity 9 capable of storing storage goods and a door 3 provided to open or close the main body 2. The door 3 may be rotatably or slidably movably provided to open or close the cavity 9. The cavity 9 may provide at least one of a refrigerating compartment and a freezing compartment.

The cavity 9 may be supplied with parts or devices of a refrigeration or a freezing cycle in which cold air is supplied into the cavity 9. For example, the parts may include a compressor 4 to compress a refrigerant, a condenser 5 to condense the compressed refrigerant, an expander 6 to expand the condensed refrigerant, and an evaporator 7 to evaporate the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

Other parts constituting the refrigeration cycle may be constituted by applying a member including a thermoelectric module.

FIG. 2 is a view schematically showing a vacuum adiabatic body used in the main body 2 and the door 3 of the refrigerator 1. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets 60 or 63 are provided are schematically illustrated for convenience of understanding.

Referring to FIG. 2, the vacuum adiabatic body may include a first plate member 10 to provide a wall of a low-temperature space or a first space, a second plate member 20 to provide a wall of a high-temperature space or a second space, and a vacuum space part or a third space 50 defined as a gap between the first and second plate members 10 and 20. Also, the vacuum adiabatic body includes the conductive resistance sheets 60 and 63 to prevent heat conduction between the first and second plate members 10 and 20. A sealing or welding part 61 may seal the conductive resistance sheets 60 and 63 to the first and second plate members 10 and 20 such that the vacuum space part 50 is in a sealed or vacuum state.

When the vacuum adiabatic body is applied to a refrigerator or a warming apparatus, the first plate member 10 providing a wall of an inner space of the refrigerator may be referred to as an inner case, and the second plate member 20 providing a wall of an outer space of the refrigerator may be referred to as an outer case.

A machine room 8 may include parts providing a refrigerating or a freezing cycle. The machine room may be placed at a lower rear side of the main body-side vacuum adiabatic body, and an exhaust port 40 to form a vacuum state by exhausting air from the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum insulator of the embodiment may also be applied to a product further having a separate wall contacting each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit or resistor provided to reduce adiabatic loss related to the factors of the heat transfer will be provided. The vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

The heat resistance unit may include a conductive resistance sheet 60 or 63 that resists conduction of heat transferred along a wall of a third space 50 and may further include a side frame coupled to the conductive resistance sheet. The conductive resistance sheet 60 or 63 and the side frame will be clarified by the following description.

Also, the heat resistance unit may include at least one radiation resistance sheet 32 that is provided in a plate shape within the third space 50 or may include a porous material that resists radiation heat transfer between the second plate member 20 and the first plate member 10 within the third space 50. The radiation resistance sheet 32 and the porous material will be clarified by the following description.

Figure 3B:
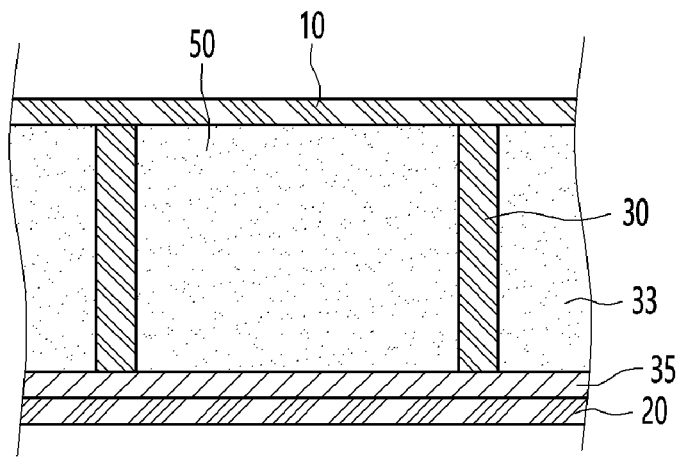
Figure 3C:
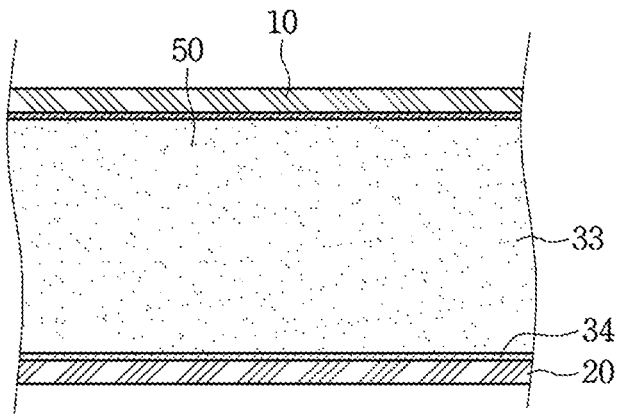

FIGS. 3A-3C are views illustrating various embodiments of an internal configuration of the vacuum space part or third space 50.

First, referring to FIG. 3A, the vacuum space part 50 may have a pressure different from that of each of the first and second spaces, preferably, a vacuum state, thereby reducing an adiabatic loss. The vacuum space part 50 may be provided at a temperature between the temperature of the first space and the temperature of the second space. Since the vacuum space part 50 is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, the adiabatic loss may be caused due to an increase in amount of heat radiation, caused by the contraction of the vacuum space part 50, and an increase in amount of heat conduction, caused by contact between the plate members 10 and 20.

The supporting unit or support 30 may be provided to reduce deformation of the vacuum space part 50. The supporting unit 30 includes a bar 31. The bar 31 may extend in a substantially vertical direction with respect to the plate members 10 and 20 to support a distance between the first plate member 10 and the second plate member 20. A support plate 35 may be additionally provided on at least any one end of the bar 31. The support plate 35 may connect at least two or more bars 31 to each other to extend in a horizontal direction with respect to the first and second plate members 10 and 20. The support plate 35 may be provided in a plate shape or may be provided in a lattice shape so that an area of the support plate contacting the first or second plate member 10 or 20 decreases, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

A material of the supporting unit 30 will be described.

The supporting unit 30 may have a high compressive strength so as to endure the vacuum pressure, a low outgassing rate and a low water absorption rate so as to maintain the vacuum state, a low thermal conductivity so as to reduce the heat conduction between the plate members 10 and 20 and. Also, the supporting unit 30 may have a secure compressive strength at a high temperature so as to endure a high-temperature exhaust process, have an excellent machinability so as to be subjected to molding, and have a low cost for molding. Here, the time required to perform the exhaust process takes about a few days. Hence, the time is reduced, thereby considerably improving fabrication cost and productivity. Therefore, the compressive strength is to be secured at the high temperature because an exhaust speed is increased as a temperature at which the exhaust process is performed becomes higher. The inventor has performed various examinations under the above-described conditions.

First, ceramic or glass has a low outgassing rate and a low water absorption rate, but its machinability is remarkably lowered. Hence, ceramic and glass may not be used as the material of the supporting unit 30. Resin may be considered as the material of the supporting unit 30.

FIG. 4 is a diagram illustrating results obtained by examining resins.

Referring to FIG. 4, the present inventor has examined various resins, and most of the resins may not be used because their outgassing rates and water absorption rates are remarkably high. Accordingly, the present inventor has examined resins that approximately satisfy conditions of the outgassing rate and the water absorption rate. As a result, polyethylene (PE) may not be used due to its high outgassing rate and its low compressive strength. Polychlorotrifluoroethylene (PCTFE) may not be used due to its remarkably high price. Polyether ether ketone PEEK may not be used due to its high outgassing rate. A resin selected from the group consisting of polycarbonate (PC), glass fiber PC, low outgassing PC, polyphenylene sulfide (PPS), and liquid crystal polymer (LCP) may be used as the material of the supporting unit 30. However, an outgassing rate of PC is 0.19, which is at a low level. Hence, as the time required to perform baking in which exhaustion is performed by applying heat is increased to a certain level, PC may be used as the material of the supporting unit 30.

The present inventor has found an optimal material by performing various studies on resins expected to be used inside the vacuum space part 50. Hereinafter, results of the performed studies will be described with reference to the accompanying drawings.

FIG. 5 is a view illustrating results obtained by performing an experiment on vacuum maintenance performances of the resins.

Referring to FIG. 5, there is illustrated a graph showing results obtained by fabricating the supporting unit 30 using the respective resins and then testing vacuum maintenance performances of the resins. First, a supporting unit 30 fabricated using a selected material was cleaned using ethanol, left at a low pressure for 48 hours, exposed to the air for 2.5 hours, and then subjected to an exhaust process at 90° C. for about 50 hours in a state where the supporting unit 30 was put in the vacuum adiabatic body, thereby measuring a vacuum maintenance performance of the supporting unit 30.

An initial exhaust performance of LCP is best, but its vacuum maintenance performance is bad. This may be caused by sensitivity of the LCP to temperature. Also, it is expected through characteristics of the graph that, when a final allowable pressure is $5 \times 10^{-3}$ Torr, its vacuum performance will be maintained for a time of about 0.5 years. Therefore, the LCP may not be used as the material of the supporting unit 30.

Regarding glass fiber PC (G/F PC), its exhaust speed is fast, but its vacuum maintenance performance is low. It is determined that this will be influenced by an additive. Also, it is expected through the characteristics of the graph that the glass fiber PC will maintain its vacuum performance under the same conditions for a time of about 8.2 years. Therefore, PC (G/F PC) may not be used as the material of the supporting unit 30.

It is expected that, in the case of the low outgassing PC (O/G PC), its vacuum maintenance performance is excellent, and its vacuum performance will be maintained under the same conditions for a time of about 34 years, as compared with the above-described two materials. However, it may be seen that the initial exhaust performance of the low outgassing PC is low, and therefore, the fabrication efficiency of the low outgassing PC is lowered.

It may be seen that, in the case of the PPS, its vacuum maintenance performance is remarkably excellent, and its exhaust performance is also excellent. Based on the vacuum maintenance performance, PPS may be used as the material of the supporting unit 30.

Figure 6A:
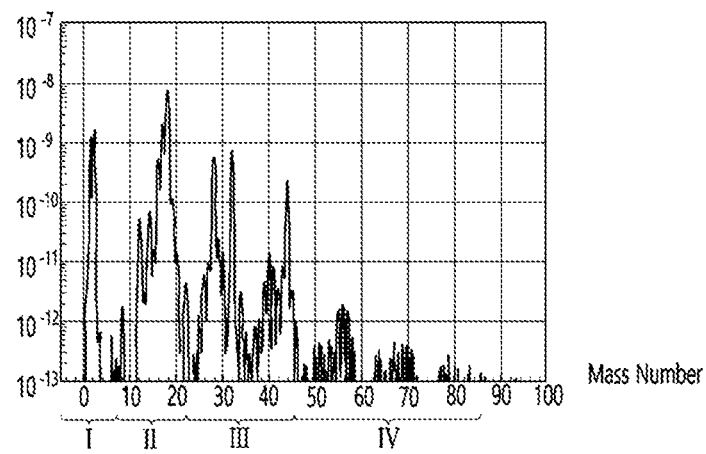
FIGS. 6A-6C illustrate results obtained by analyzing components of gases discharged from a PPS and a low outgassing PC.
Figure 6B:
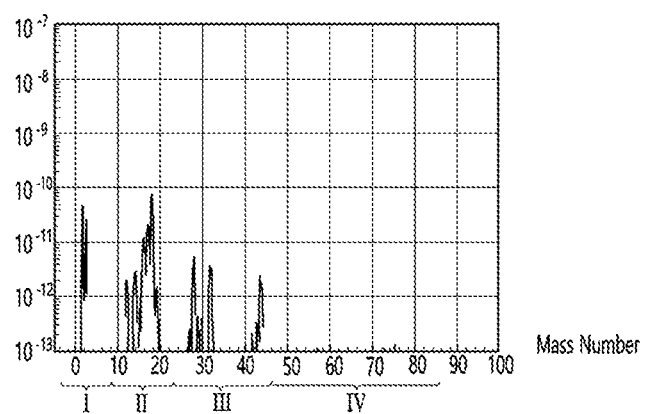
Figure 6C:
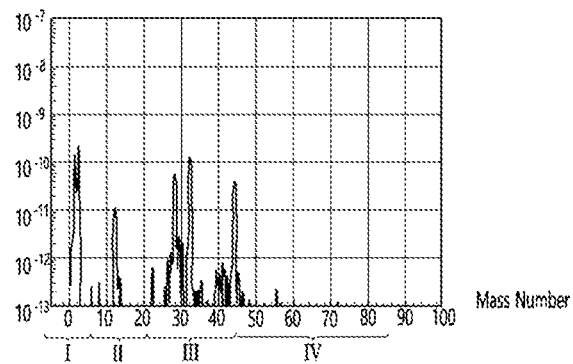

FIGS. 6A-6C illustrate results obtained by analyzing components of gases discharged from the PPS and the low outgassing PC, in which the horizontal axis represents mass numbers of gases and the vertical axis represents concentrations of gases. FIG. 6A illustrates a result obtained by analyzing a gas discharged from the low outgassing PC. In FIG. 6A, it may be seen that hydrogen or $H_2$ series (I), water or $H_2O$ series (II), dinitrogen/carbon monoxide/carbon dioxide/oxygen or $N_2/CO/CO_2/O_2$ series (III), and hydrocarbon series (IV) are equally discharged. FIG. 6B illustrates a result obtained by analyzing a gas discharged from the PPS. In FIG. 6B, it may be seen that the $H_2$ series (I), $H_2O$ series (II), and $N_2/CO/CO_2/O_2$ series (III) are discharged to a weak extent. FIG. 6C is a result obtained by analyzing a gas discharged from stainless steel. In FIG. 6C, it may be seen that a similar gas to the PPS is discharged from the stainless steel. Consequently, it may be seen that the PPS discharges a similar gas to the stainless steel.

As the analyzed result, it may be re-confirmed that the PPS is excellent as the material of the supporting unit 30.

FIG. 7 illustrates results obtained by measuring maximum deformation temperatures at which resins are damaged by atmospheric pressure in high-temperature exhaustion. At this time, the bars 31 were provided at a diameter of 2 mm at a distance of 30 mm. Referring to FIG. 7, it may be seen that a rupture occurs at 60° C. in the case of the PE, a rupture occurs at 90° C. in the case of the low outgassing PC, and a rupture occurs at 125° C. in the case of the PPS.

As the analyzed result, it may be seen that the PPS may be used as the resin used inside the vacuum space part 50. However, the low outgassing PC may be used in terms of fabrication cost.

Referring back to FIG. 3A, a radiation resistance sheet 32 to reduce heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be used as the material of the radiation resistance sheet 32. In an embodiment, an aluminum foil having an emissivity of 0.02 may be used as the radiation resistance sheet 32. Also, since the transfer of radiation heat may not be sufficiently blocked using one radiation resistance sheet 32, at least two radiation resistance sheets 32 may be provided at a certain distance so as not to contact each other. Also, at least one radiation resistance sheet 32 may be provided in a state in which it contacts the inner surface of the first or second plate member 10 or 20.

Referring to FIG. 3B, the distance between the plate members 10 and 20 is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for resisting the radiation heat transfer.

In the present embodiment, the vacuum adiabatic body may be manufactured without the radiation resistance sheet 32.

Referring to FIG. 3C, the supporting unit 30 to maintain the vacuum space part 50 may not be provided. A porous material 333 may be provided to be surrounded by a film 34 instead of the supporting unit 30. Here, the porous material 33 may be provided in a state of being compressed so that the gap of the vacuum space part 50 is maintained. The film 34 made of, for example, a PE material provided in a state in which a hole is punched in the film 34.

In the present embodiment, the vacuum adiabatic body may be manufactured without the supporting unit 30. That is to say, the porous material 33 may perform the function of the radiation resistance sheet 32 and the function of the supporting unit 30 together.

Figure 8A:
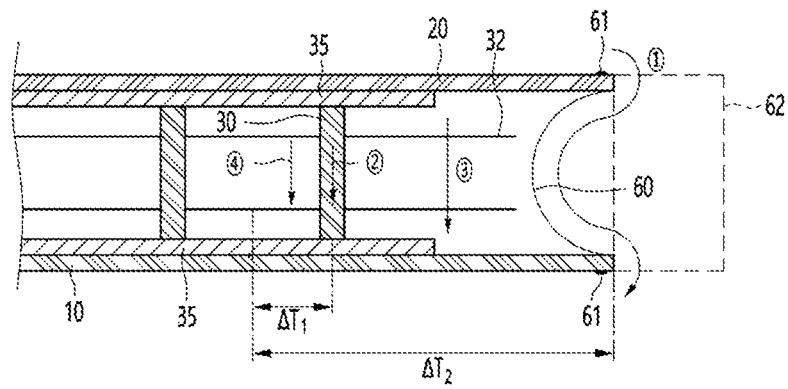
FIGS. 8A-8C are views showing various embodiments of conductive resistance sheets and peripheral parts thereof.
Figure 8B:
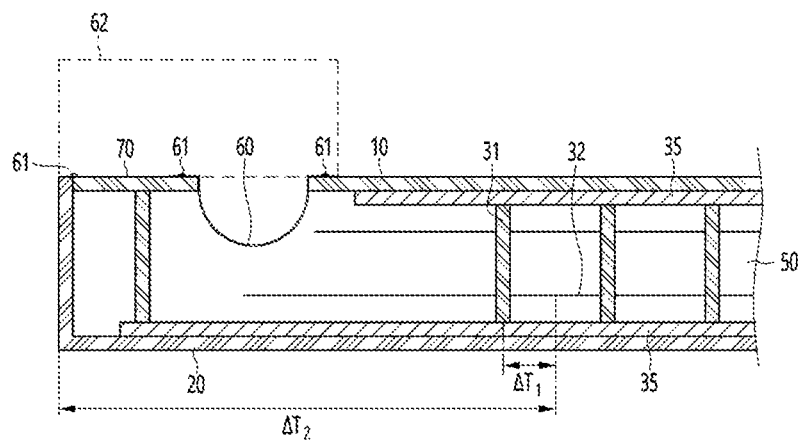
Figure 8C:
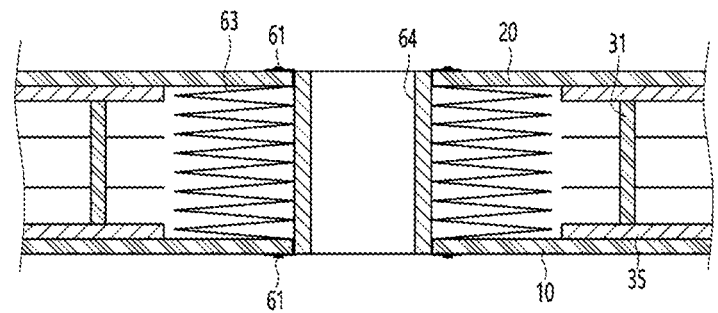

FIGS. 8A-8C are views showing various embodiments of conductive resistance sheets 60 or 63 and peripheral parts thereof. Structures of the conductive resistance sheets 60 or 63 are briefly illustrated in FIG. 2, but will be understood in detail with reference to the drawings.

First, a conductive resistance sheet 60 proposed in FIG. 8A may be applied to the main body-side vacuum adiabatic body. Specifically, the first and second plate members 10 and 20 may be sealed so as to vacuumize the interior of the vacuum adiabatic body. In this case, since the first and second plate members 10 and 20 have different temperatures from each other, heat transfer may occur between the first and second plate members 10 and 20. A conductive resistance sheet 60 is provided to prevent heat conduction between two different kinds of plate members 10 and 20.

The conductive resistance sheet 60 may be provided with sealing or welding parts 61 at which both ends of the conductive resistance sheet 60 are sealed to define at least one portion of the wall for the third space or vacuum space part 50 and maintain the vacuum state. The conductive resistance sheet 60 may be provided as a thin foil in unit of micrometer so as to reduce the amount of heat conducted along the wall for the vacuum space part 50. The sealing parts 610 may be provided as welding parts, and the conductive resistance sheet 60 and the plate members 10 and 20 may be fused to each other. In order to cause a fusing action between the conductive resistance sheet 60 and the first and second plate members 10 and 20, the conductive resistance sheet 60 and the first and second plate members 10 and 20 may be made of the same material (e.g., a stainless material). The sealing parts 610 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member 10 and 20, so that the amount of heat conduction may be further reduced.

A change in temperature occurs along the conductive resistance sheet 60. Therefore, in order to block heat transfer to the exterior of the conductive resistance sheet 60, a shielding part or cover 62 may be provided at the exterior of the conductive resistance sheet 60 such that an adiabatic action occurs. In other words, in the refrigerator 1, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 may not serve as a conductive resistor at the exposed portion.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body 2 and the door 3 are opened, the shielding part 62 may be provided as a porous material or a separate adiabatic structure.

A conductive resistance sheet 60 proposed in FIG. 8B may be applied to the door-side vacuum adiabatic body. In FIG. 8B, portions different from those of FIG. 8A are described in detail, and the same description is applied to portions identical to those of FIG. 8A. A side frame 70 is further provided at an outside of the conductive resistance sheet 60. A part or seal to seal between the door 3 and the main body 2, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part 50, i.e., a corner side portion of the vacuum space part 50. This is because, unlike the main body 2, a corner edge portion of the door 3 is exposed to the exterior. More specifically, if the conductive resistance sheet 60 is placed at the front end portion of the vacuum space part 50, the corner edge portion of the door 3 is exposed to the exterior, and hence there is a disadvantage in that a separate adiabatic part should be configured so as to heat-insulate the conductive resistance sheet 60.

A conductive resistance sheet 63 proposed in FIG. 8C may be installed in the pipeline 64 passing through the vacuum space part 50. In FIG. 8C, portions different from those of FIGS. 8A and 8b are described in detail, and the same description is applied to portions identical to those of FIGS. 8A and 8B. A conductive resistance sheet 63 having a similar shape as that of FIG. 8A, such as a wrinkled or zig-zag conductive resistance sheet 63, may be provided at a peripheral portion of the pipeline 64. Accordingly, a heat transfer path may be lengthened, and deformation caused by a pressure difference may be prevented. In addition, a separate shielding part may be provided to improve the adiabatic performance of the conductive resistance sheet.

A heat transfer path between the first and second plate members 10 and 20 will be described with reference back to FIG. 8A. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various depending on various design dimensions. For example, the supporting unit 30 may be changed such that the first and second plate members 10 and 20 may endure a vacuum pressure without being deformed, the vacuum pressure may be changed, the distance between the first and second plate members 10 and 20 may be changed, and the length of the conductive resistance sheet 60 or 63 may be changed. The transfer heat may be changed depending on a difference in temperature between the spaces (the first and second spaces) respectively provided by the plate members 10 and 20. In the embodiment, a configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become the smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is the largest. For example, the heat transfer amount by the solid conduction heat may reach 75% of the total heat transfer amount. A heat transfer amount by the radiation transfer heat ③ is smaller than the heat transfer amount by the solid conduction heat but larger than the heat transfer amount of the gas conduction heat. For example, the heat transfer amount by the radiation transfer heat ③ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Equation 1.

$$eK_{solid\ conduction\ heat} > eK_{radiation\ transfer\ heat} > eK_{gas\ conduction\ heat} \quad \text{Equation 1}$$

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area ($m^2$) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet 60 or 63, and a thermal conductivity (k) of the conductive resistance sheet 60 or 63 (the thermal conductivity of the conductive resistance sheet is a material property of a material and may be obtained in advance). For the supporter conduction heat, a conductive calorific value may be obtained through a temperature difference ($\Delta T$) between an entrance and an exit of the supporting unit 30, a sectional area (A) of the supporting unit 30, a length (L) of the supporting unit 30, and a thermal conductivity (k) of the supporting unit 30. Here, the thermal conductivity of the supporting unit 30 is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat may be changed depending on various variables including a kind, an amount, and the like of the porous material.

According to an embodiment, a temperature difference $\Delta T_1$ between a geometric center formed by adjacent bars 31 and a point at which each of the bars 31 is located may be preferably provided to be less than 0.5° C. Also, a temperature difference $\Delta T_2$ between the geometric center formed by the adjacent bars 31 and an edge portion of the vacuum adiabatic body may be preferably provided to be less than 0.5° C. In the second plate member 20, a temperature difference between an average temperature of the second plate member 20 and a temperature at a point at which a heat transfer path passing through the conductive resistance sheet 60 or 63 meets the second plate member 20 may be the largest. For example, when the second space is a region hotter than the first space, the temperature at the point at which the heat transfer path passing through the conductive resistance sheet 60 or 63 meets the second plate member 20 becomes lowest. Similarly, when the second space is a region colder than the first space, the temperature at the point at which the heat transfer path passing through the conductive resistance sheet 60 or 63 meets the second plate member 20 becomes highest.

This means that the amount of heat transferred through other points except the surface conduction heat passing through the conductive resistance sheet 60 or 63 should be controlled, and the entire heat transfer amount satisfying the vacuum adiabatic body may be achieved only when the surface conduction heat occupies the largest heat transfer amount. To this end, a temperature variation of the conductive resistance sheet 60 or 63 may be controlled to be larger than that of the plate members 10 and 20.

Physical characteristics of the parts constituting the vacuum adiabatic body will be described. In the vacuum adiabatic body, a force by vacuum pressure is applied to all of the parts. Therefore, a material having a strength (N/m$^2$) of a certain level may be preferably used.

Under such conditions, the plate members 10 and 20 and the side frame 70 may be made of a material having a sufficient strength with which they are not damaged by even vacuum pressure. For example, when the number of bars 31 is decreased so as to limit the support conduction heat, deformation of the plate members 10 and 20 may occur due to the vacuum pressure, which may bad influence on the external appearance of refrigerator. The radiation resistance sheet 32 may be made of a material that has a low emissivity and may be easily subjected to thin film processing. Also, the radiation resistance sheet 32 is to ensure a strength strong enough not to be deformed by an external impact. The supporting unit 30 is provided with a strength strong enough to support the force by the vacuum pressure and endure an external impact, and is to have machinability. The conductive resistance sheet 60 may be made of a material that has a thin plate shape and may endure the vacuum pressure.

In an embodiment, the plate members 10 and 20, the side frame 70, and the conductive resistance sheet 60 or 63 may be made of stainless materials having the same strength. The radiation resistance sheet 32 may be made of aluminum having a weaker strength that the stainless materials. The supporting unit 30 may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a high or predetermined strength, but the stiffness of the material may be low so as to increase heat resistance and minimize radiation heat as the conductive resistance sheet 60 or 63 is uniformly spread without any roughness when the vacuum pressure is applied. The radiation resistance sheet 32 requires a stiffness of a certain level so as not to contact another part due to deformation. Particularly, an edge portion of the radiation resistance sheet 32 may generate conduction heat due to drooping caused by the self-load of the radiation resistance sheet 32. Therefore, a stiffness of a certain level is required. The supporting unit 30 may require a stiffness strong enough to endure a compressive stress from the plate members 10 and 20 and an external impact.

In an embodiment, the plate members 10 and 20 and the side frame 70 may have the highest stiffness so as to prevent deformation caused by the vacuum pressure. The supporting unit 30, particularly, the bar 31 may have the second highest stiffness. The radiation resistance sheet 32 may have a stiffness that is lower than that of the supporting unit 30 but higher than that of the conductive resistance sheet 60 or 63. Lastly, the conductive resistance sheet 60 or 63 may be made of a material that is easily deformed by the vacuum pressure and has the lowest stiffness.

Even when the porous material 33 is filled in the vacuum space part 50, the conductive resistance sheet 60 or 63 may have the lowest stiffness, and the plate members 10 and 20 and the side frame 70 may have the highest stiffness.

The vacuum space part 50 may resist heat transfer by only the supporting unit 30. Here, a porous material 33 may be filled with the supporting unit 30 inside the vacuum space part 50 to resist to the heat transfer. The heat transfer to the porous material 33 may resist without applying the supporting unit 30.

In the above description, as a material suitable for the supporting unit 30, a resin of PPS has been proposed. The bar 31 is provided on the support plate 35 at gaps of 2 cm to 3 cm, and the bar 31 has a height of 1 cm to 2 cm. These resins often have poor fluidity of the resin during the molding. In many cases, the molded article does not have the designed value. Particularly, the shape of a molded product such as a bar 31 having a short length is often not provided properly due to non-uniform injection of resin into a part far from the liquid injection port of the liquid.

This may cause damage of the supporting unit 30 or a defective vacuum adiabatic body later.

If the bar 31 is not manufactured at an expected value during the molding, the incomplete state such as non-coupling during the coupling process is not grasped, and the bar 31 may be broken when vacuum evacuation is performed in a state of the bar 31 being inserted into the vacuum adiabatic body. Even though the bar 31 is broken, it is difficult to grasp the damage of the bar 31. The initial failure of the supporting unit 30 may not be a problem except for the aesthetics in the initial use process, but concentrated stress may be continuously applied to the damaged portion, and subsequently. Thus, the adiabatic efficiency of the vacuum adiabatic body may be reduced, or the vacuum breakage may occur.

Hereinafter, a supporting unit 30 to solve the above-described limitation will be described.

FIG. 9 is a cross-sectional view of the supporting unit 30 according to an embodiment.

Referring to FIG. 9, a supporting unit 30 according to an embodiment includes a one-side or first support plate or portion 200 installed to correspond to an inner surface of one plate member of a pair of plate members 10 and 20 and an other-side or second support plate or portion 300 installed to correspond to an inner surface of the other plate member 10 or 20.

The other-side support plate 300 is provided with a support plate or panel 335 installed to contact the plate member 10 or 20 and a bar or pillar 331 extending away from the support plate 335 toward an opposite plate member 10 or 20.

The bar 331 includes at least two kinds of bars. One or a first kind of bar 331 is coupled to the one-side support plate 200, and the other or a second kind of bar 331 functions to be seated without being coupled to the one-side support plate 200. The bar 331 that only functions to be seated may be called a seating mechanism.

That is to say, the one kind of bar 331 is coupled in a manner such as press-fitting so that the one-side support plate 200 and the other-side support plate 300 are fixed in position without requiring other members. The other kind of bar 331 acts as a stopper mechanism that is no longer moving in a direction in which the support plates 200 and 300 are approaching without an operation of a physical mechanism such as the press-fitting.

At least two kinds of supporting mechanisms provided to correspond to the bar 331 are provided on the other-side support plate 300. One of the supporting mechanisms may be a coupling protrusion 220 protruding from a support plate or panel 235 of the one-side support plate 200 toward the other-side support plate 300. The other one of the supporting mechanisms may be a seating protrusion 210 protruding from the support plate 235 of the one-side support plate 200 toward the other-side support plate 300.

A recess may be provided in the coupling protrusion 220, and the one kind of bar 331 may be firmly coupled to the recess of the coupling protrusion 220 in a press-fitting manner. The seating protrusion 210 may include a taper or incline 211, and an end of the other kind of bar 331 may be provided in the tapered portion defined by an inner side of the taper 211. The taper 211 may be provided to be inclined inward and configured so that the bar 331 is easily located.

Since the coupling protrusion 220 is firmly coupled in the manner such as the press-fitting, the coupling protrusion 220 may be called a coupling part. The seating protrusion 210 may receive and hold the bar 331 so as to prevent the one-side support plate 200 from approaching the other-side support plate 300 regardless of the coupling, and thus, be called a seating part.

As described above, the bar 331 installed to correspond to the coupling part 220 may be firmly coupled. The one-side support plate 200 and the other-side support plate 300 may be coupled to each other without using other additional members. The coupling part 220 and the one kind of bar 331 may be firmly coupled to each other in the press-fitting manner and thus be called a coupling mechanism.

The coupling mechanism and the seating mechanism may be provided to be spaced apart from each other.

The bar 331 installed to correspond to the seating part may maintain a gap between the support plates 200 and 300 without the coupling operation therebetween to prevent the gap between the two support plates 200 and 300 from decreasing even though a vacuum pressure is applied to the inside of the vacuum adiabatic body. As the gap between the seating part 210 and the bar 331 is prevented from decreasing, the seating part 210 and the other kind of bar 331 may be called a seating mechanism.

Since only the limited number of coupling protrusions 220 is provided, the worker may pay attention to the fact that only the bar 331 inserted into the coupling protrusion 220 is properly inserted, and thus, the worker may have an advantage of reducing the labor thereof. Also, the worker may observe the shapes of the coupling protrusions 220 and the seating protrusions 210 and accurately know the positions to be coupled. Thus, the worker may have an advantage in that assembly may be more convenient. In addition, since it is possible to perform the coupling work by paying attention only to the coupling of the coupling protrusion 220 and the bar 331, the possibility of damage or the like may be reduced later, and the damage may not occur in the vacuum evacuation process.

FIG. 10 is a cross-sectional view of a supporting unit 30 according to another embodiment. FIG. 10 is the same as in FIG. 9 in many parts. Thus, the description of FIG. 9 is applied as it is without any specific explanation, and only the characteristic differences will be specifically described.

Referring to FIG. 10, a seating recess 230 is provided in the one-side support plate 200. The seating recess 230 may not extend from the support plate 235 to the other-side support plate 300 but be tapered so as to be inserted or recessed into an inner space of the support plate 235. In this case, the other kind of bar 331 may need to be longer than the one kind of bar 331 to correspond to the seating recess 230.

Since the seating recess 230 has a larger difference in shape than the seating protrusion 210 when compared to the coupling protrusion 220, it is possible to more easily distinguish the seating recess 230 from the coupling protrusion 220 than it is to distinguish the seating protrusion 210 from the coupling protrusion 220.

Although the seating protrusion 210 is changed into the seating recess 230 in FIG. 10, the coupling protrusion 220 may alternatively be changed into a coupling recess. Such a coupling recess may be provided with a taper 211 which is inserted or recessed into the support plate 235.

The embodiment of the above-described supporting unit 30 shows a case in which no separate member is applied for coupling the pair of support plates 200 and 300. In addition to this constituent, a separate coupling member may be used to couple the pair of support plates 200 and 300. Hereinafter, a case in which a separate coupling member is applied.

FIG. 11 a cross-sectional view of the supporting unit 30 when a coupling member is applied so that the support plate 200 or 300 is coupled.

Referring to FIG. 11, the seating protrusion 210 may provide a seating part that is provided as in the foregoing embodiment. The seating recess 230 may be substituted for the seating protrusion 210.

The support plate 335 of the other-side support plate 300 may be provided with a pressing part 351 which is formed into a tapered hole shape. A coupling member or protrusion 400 may be inserted into the pressing part 351. A bolt may be exemplified as an example of the coupling member 400. The coupling member 400 may include a head part 401 and a body part 402, and the head part 401 may be inserted up to a position for pressing the pressing part 351. At least a portion of the pressing part 351 may be tapered to allow the head part 410 to surface-contact the pressing part 351 so that the worker easily knows the complication of the coupling through the inserted depth of the coupling member 400.

A coupling boss 340 to which the body part 402 is inserted to be coupled to each other may be provided on the one-side support plate 200. The body part 402 and the coupling boss 340 may have screw threads corresponding to each other so that the body part 402 and the coupling boss 340 are coupled to each other. Other coupling methods such as the insertion method and a jaw structure may be applied not only for the screw thread. When the screw thread is provided, since a resin material that is a material for the supporting unit 30 has high brittleness after the thermal treatment, the screw thread may be provided before the thermal treatment.

The coupling member 400 may be made of stainless steel or a material coated with low thermal conductivity and outgassing.

An end of the head part 401 is positioned below an upper end of the support plate 335 in a state in which the coupling of the coupling member 400 is completed. Thus, a distance H1 between the upper end of the head part 401 and the upper end of the support plate 335 is necessarily set to a positive number. This is for the purpose of preventing thermal conduction due to direct contact between the plate members 10 and 20 made of the same metal and the coupling member 400.

The one-side support plate 200 and the other-side support plate 300 may be coupled together by the coupling boss 340, the coupling member 400, and the pressing part 351. Thus, the coupling boss 340, the coupling member 400, and the pressing part 351 are collectively called a coupling mechanism. The coupling mechanism may be the same as the case in which the bar 331 and the coupling protrusion 220 are coupled together. In this embodiment, it is seen that the seating mechanism is provided as in the previous embodiment.

The inside of the coupling boss 340 may be empty or filled. In this case, the description will be made by changing the drawings.

Figure 12:
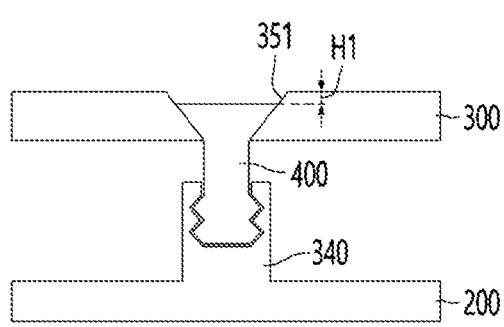
FIG. 12 is a view illustrating a state in which the inside of a coupling boss is filled.
Figure 13:
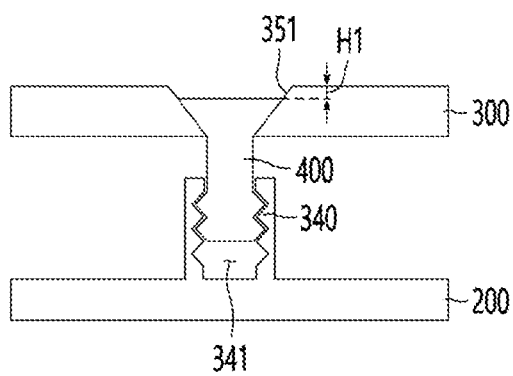
FIG. 13 is a view illustrating a state in which the inside of the coupling boss is empty.

FIG. 12 illustrates a state in which the inside of the coupling boss is filled, and FIG. 13 illustrates a state in which the inside of the coupling boss is empty.

Referring to FIG. 12, it is seen that the inside of the coupling boss 340 is filled. In this case, since a strength of the coupling boss 340 is reinforced, the coupling boss 340 may not be broken even if the coupling member 400 is coupled in a state of high brittleness after the thermal treatment.

Referring to FIG. 13, it is seen that the inside of the coupling boss 340 is empty and has a space 341. In this case, although the action of the coupling boss 340 on the reinforcement of strength is reduced, an amount of outgassing may be more reduced. Thus, an amount of outgassing to be generated may be more reduced.

A ratio and the number of coupling mechanism and seating mechanism may vary according to various factors such as a size of the support plate, the number of bars, and a size of the bar. However, an arrangement of the coupling mechanism is defined by the coupling relationship between the one-side support plate and the other-side support plate, and will be described below.

Figure 14:
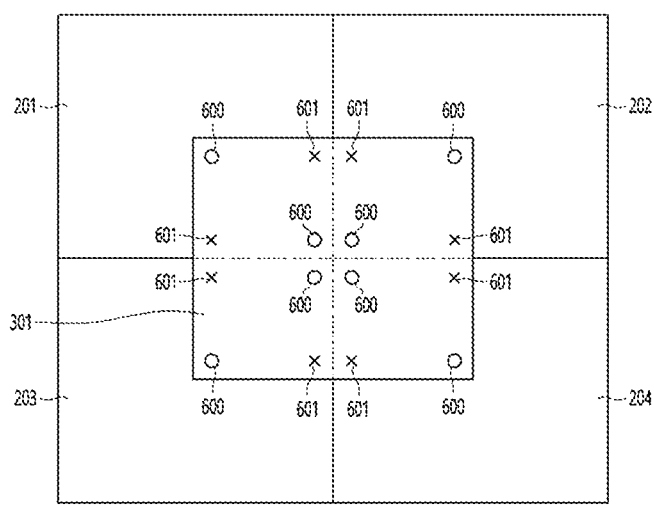
FIG. 14 is a view illustrating a state in which a one-side support plate and the other-side support plate overlap each other.

FIG. 14 is a view illustrating a state in which a one-side support plate and the other-side support plate overlap each other. One lower support plate provided at a lower side in the drawing is provided with four partial support plates 201 to 204 that are horizontally aligned with each other so as to lie along a same horizontal plane. The other-side support plate 301 may be provided at an upper side in the drawing 1. There may be one other-side support plate 301, or alternatively, there may be a plurality of partial other-side support plates 301, 302, etc. lying along a same horizontal plane (FIG. 15), instead of or in addition to the plurality of one-side support plates 201-204. A technique of Cited Document 5 may be applied, but the present disclosure is not limited thereto.

Referring to FIG. 14, the coupling mechanism may be provided first on a first coupling position 600. Here, the coupling mechanism may be implemented as any one of the various mechanisms described above to integrate the one-side support plate 200 and the other-side support plate 300.

The first coupling position 600 may be defined as a position of each of vertexes or corners of the =support plates 301 and/or 201-204 (it does not matter whether the vertexes belong to the other-side support plate 301 or the partial one-side support plates 201-204, so long as the vertexes are at positions allowing the coupling mechanism to extend between the one side support plates 201-204, on the one side, and the other-side support plate(s) 301, on the other side) in a region in which the other-side support plate 301 and the one-side support plates 201-204 vertically overlap each other. These first coupling positions 600 are displayed as circles in the drawing. As described above, when the first coupling positions 600 of the coupling mechanism are determined in advance, the labor of the worker may be further reduced.

When larger coupling force is required for reasons in which a size of the supporting unit 30 is too large, or a size of the individual support plate 301 or 201-204 is small at the time of manufacturing the supporting unit 30, the number of positions at which the coupling mechanism is installed may increase.

To increase a number of coupling mechanisms, second coupling positions 601 may be provided. The second coupling positions 601 may be defined as a position excluding the first coupling position 600 among the positions of all the vertexes of all the individual overlapping regions defined by vertically overlapping at least one different partial support plate 201-204. The area indicated by reference symbol x in the drawing may be applicable. As illustrated in FIG. 14, the first coupling positions 600 are shown to be provided at outermost corners of the other-side support plate 301 and inner most corners of the one-side support plates 201-204, while the second coupling positions 602 are shown to be provided at positions of where other vertexes would be placed if the other-side support plate 301 comprised a plurality of other-side support plates 301, 302 (FIG. 15). If only one other-side support plate 301 is provided, the second coupling positions 601 may be provided at positions corresponding to an edge of the other-side support plate 301, on top, and edges of two one-side partial support plates (e.g., 201 and 202) adjacent to each other.

Although not shown, except for the first and second coupling positions 600 and 601, all other places where the bar 31 is provided may be provided with the seating mechanism. However, the number of coupling mechanisms may be less than that of seating mechanisms so as to reduce the labor of the worker.

FIG. 15 is a view illustrating another embodiment.

Referring to FIG. 15, when a plurality of one-side support plates 201, 202 are provided, the one-side support plates 201, 202 may be coupled horizontally by the coupling mechanism, rather than being horizontally coupled to each other in the manner described in Cited Document 5.

This will be described in detail. A first one-side support plate 201 and a second one-side support plate 202 are provided. Also, the two partial one-side support plates 201 and 202 contact each other, but the contact surfaces are not coupled to each other. In this case, a coupling plate 500 having at least two coupling mechanisms, which are integrated with each other, may be provided as a mechanism for coupling the two partial one-sided support plates 201 and 202. There may further be partial other-side support plates, 301 and 302, and a plate portion of the coupling plate 500 may lie along a same horizontal plane as the partial other-side support plates 301, 302. The coupling plate 500 may cover contact surfaces between the two partial one-sided support plates 201 and 202 such that the coupling plate 500 is not exactly aligned with the one-sided partial plates 201 and 202 and instead staggered.

The coupling mechanism may have various configurations as described above.

Hereinafter, a vacuum pressure of the vacuum adiabatic body will be described.

FIG. 16 illustrates graphs showing changes in adiabatic performance and changes in gas conductivity with respect to vacuum pressures by applying a simulation.

Referring to FIG. 16, it may be seen that, as the vacuum pressure is decreased, i.e., as the vacuum degree is increased, a heat load in the case of only the main body (Graph 1) or in the case where the main body 2 and the door 3 are joined together (Graph 2) is decreased as compared with that in the case of the typical product formed by foaming polyurethane, thereby improving the adiabatic performance. However, it may be seen that the degree of improvement of the adiabatic performance is gradually lowered. Also, it may be seen that, as the vacuum pressure is decreased, the gas conductivity (Graph 3) is decreased. However, it may be seen that, although the vacuum pressure is decreased, the ratio at which the adiabatic performance and the gas conductivity are improved is gradually lowered. Therefore, the vacuum pressure may be greatly reduces or reduced as low as possible. However, it takes a long time to obtain excessive vacuum pressure, and much cost is consumed due to excessive use of a getter. In the embodiment, an optimal vacuum pressure is proposed from the above-described point of view.

FIG. 17 is a graph illustrating results obtained by observing a time and a pressure in a process of exhausting the inside of the vacuum adiabatic body when a supporting unit 30 is used.

Referring to FIG. 17, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more ($\Delta T1$). After that, the getter is activated by disconnecting the vacuum space part 50 from the vacuum pump and applying heat to the vacuum space part 50 ($\Delta T2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10-6$ Torr.

In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10-6$ Torr.

FIG. 18 is a graph obtained by comparing a vacuum pressure with gas conductivity.

Referring to FIG. 18, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside the vacuum space part 50, the gap is a distance between the radiation resistance sheet 32 and the plate member 10 or 20 adjacent thereto. When the radiation resistance sheet 32 does not exist inside the vacuum space part 50, the gap is a distance between the first and second plate members 10 and 20.

It was seen that, since the size of the gap is small at a point corresponding to a typical effective heat transfer coefficient of 0.0196 W/mK, which is provided to a adiabatic material formed by foaming polyurethane, the vacuum pressure is $2.65 \times 10-1$ Torr even when the size of the gap is 2.76 mm. Meanwhile, it was seen that the point at which reduction in adiabatic effect caused by gas conduction heat is saturated even though the vacuum pressure is decreased is a point at which the vacuum pressure is approximately $4.5 \times 10-3$ Torr. The vacuum pressure of $4.5 \times 10-3$ Torr may be defined as the point at which the reduction in adiabatic effect caused by gas conduction heat is saturated. Also, when the effective heat transfer coefficient is 0.1 W/mK, the vacuum pressure is $1.2 \times 10-2$ Torr.

When the vacuum space part 50 is not provided with the supporting unit 30 but provided with the porous material 33, the size of the gap ranges from a few micrometers to a few hundreds of micrometers. In this case, the amount of radiation heat transfer is small due to the porous material 33 even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10-4$ Torr. Also, the vacuum pressure at the point at which the reduction in adiabatic effect caused by gas conduction heat is saturated is approximately $4.7 \times 10-2$ Torr. Also, the pressure where the reduction in adiabatic effect caused by gas conduction heat reaches the typical effective heat transfer coefficient of 0.0196 W/mK is 730 Torr.

When the supporting unit 30 and the porous material 33 are provided together in the vacuum space part 50, a vacuum pressure may be created and used, which may be a middle pressure between the vacuum pressure when only the supporting unit 30 is used and the vacuum pressure when only the porous material 33 is used.

In the description of the present disclosure, a part for performing the same action in each embodiment of the vacuum adiabatic body may be applied to another embodiment by properly changing the shape or dimension of foregoing another embodiment. Accordingly, still another embodiment may be easily proposed. For example, in the detailed description, in the case of a vacuum adiabatic body suitable as a door-side vacuum adiabatic body, the vacuum adiabatic body may be applied as a main body-side vacuum adiabatic body by properly changing the shape and configuration of a vacuum adiabatic body.

The vacuum adiabatic body proposed in the present disclosure may be preferably applied to refrigerators. However, the application of the vacuum adiabatic body is not limited to the refrigerators, and may be applied in various apparatuses such as cryogenic refrigerating apparatuses, heating apparatuses, and ventilation apparatuses.

INDUSTRIAL APPLICABILITY

According to the embodiments, the influence of the vacuum pressure inside the vacuum adiabatic body may be reduced, and the labor of the worker may be reduced. Thus, the industrial application may be expected to be actively promoted when the refrigerator to which the vacuum adiabatic body is applied is carried out.

The invention claimed is:

1. A vacuum adiabatic body comprising:
   a first plate
   a second plate;
   a vacuum space provided between the first plate and the second plate;
   a support configured to maintain a distance between the first and second plates, the support being disposed next to or adjacent to the first plate and including:
      a first support plate configured to support the first plate;
      a second support plate configured to support the second plate;
      at least one coupling mechanism configured to secure the first support plate to the second support plate and including a first bar extending from the second support plate, and a coupling protrusion protruding from the first support plate; and
      a plurality of seating mechanisms configured to maintain a distance between the first support plate and the second support plate and including a second bar extending from the second support plate, and a recess formed in the first support plate,
      wherein the first bar is coupled to the coupling protrusion to not allow the first bar to be separable from the coupling protrusion, and the second bar is seated on the recess to allow the second bar to be separable from the recess.

2. The vacuum adiabatic body according to claim 1, wherein a number of seating mechanisms is greater than that of the at least one coupling mechanism.

3. The vacuum adiabatic body according to claim 1, wherein the coupling protrusion includes another recess configured to receive the bar.

4. The vacuum adiabatic body according to claim 1, wherein the first support plate comprises a plurality of first partial support plates that are aligned horizontally,
   wherein the at least one coupling mechanism includes a plurality of coupling mechanisms, and the positions of the coupling mechanisms are provided at vertexes of the plurality of first partial support plates.

5. The vacuum adiabatic body according to claim 4, wherein the coupling mechanisms are provided at all vertexes of the first partial support plates that are provided below the second support plate and at all vertexes of the second support plate that are provided above the first support plate.

6. The vacuum adiabatic body according to claim 1, at least one of the first support plate or the second support plate comprises at least two partial support plates, and at least two coupling mechanisms are integrated with each other to form a coupling frame configured to couple the at least two partial support plates to each other.

7. A refrigerator comprising:
   a main body having an internal space configured to store items; and
   a door to open or close the main body to allow access to the internal space,
   wherein at least one of the door or the main body comprises a vacuum adiabatic body, the vacuum adiabatic body including:
      a first plate;
      a second plate;
      a vacuum space provided between the first plate and the second plate;
      a support configured to maintain a distance between the first and second plates, the support being disposed next to or adjacent to the first plate,
      wherein the support includes:
         a first support plate configured to support the first plate;
         a second support plate configured to support the second plate;
         a plurality of coupling mechanisms configured to maintain a distance between the first support plate and the second support plate and secure the first support plate and the second support plate to each other; and
         a plurality of seating mechanisms configured to add structural rigidity to the support and maintain an alignment of the first and second plates.

8. A vacuum adiabatic body comprising:
   a first plate
   a second plate;
   a vacuum space provided between the first plate and the second plate;
   a support configured to maintain a distance between the first plate and the second plate, the support being disposed next to or adjacent to the first plate and including:
      a first support plate in contact with the first plate in the space, the first support plate including a plurality of bars protruding in the first direction; and
      a second support plate in contact with the second plate in the space, the second support plate having a plurality of recesses,
      wherein the recesses include a set of first recesses having a first width and a set of second recesses having a second width different from the first width.

9. The vacuum adiabatic body according to claim 8, wherein the bars include a set of first bars and a set of second bars, the first bars configured to be fitted inside the first recesses, respectively, and the second bars configured to be aligned with the second recesses, respectively.

10. The vacuum adiabatic body according to claim 8, wherein an inner surface of the second recess is inclined outward from a bottom to a top.

11. The vacuum adiabatic body according to claim 9, wherein the first recesses are formed in a coupling boss protruding from the second support plate toward the first support plate, the first bars have a first end configured to be inserted into the first recesses and a second end, and the first support plate is formed with a pressing opening configured to receive and support the second ends of the first bars.

12. The vacuum adiabatic body according to claim 11, wherein the first end of the first bar is formed with threads, and an inner surface of the first recess is formed with threads such that the first bar screws into the first recess of the coupling boss.

13. The vacuum adiabatic body according to claim 8, wherein at least one of the first support plate or the second support plate comprises a plurality of partial support plates provided on a same plane, and the plurality of bars are provided at vertexes of the plurality of partial support plates.

14. The vacuum adiabatic body of claim 8, wherein the second recess is formed in a protrusion that protrudes from the second support plate.

15. The vacuum adiabatic body of claim 9, wherein the second recess is formed to be depressed downward in the second support plate, the first recess is formed in a protrusion that protrudes from the second support plate, and a length of the each of the second bars is longer than a length of the first bar.

16. The vacuum adiabatic body of claim 11, wherein the second end of the first bars has a truncated cone shape, the pressing opening is formed to have a truncated cone shape, an inner surface of the pressing opening supports an outer surface of the second end of the first bars, and a top of the second end of the first bars has a height less than a top of the first support plate such that the second end of the first bars does not protrude beyond the first support plate.

17. The vacuum adiabatic body of claim 5, wherein the second support plate comprises a plurality of second partial support plates, wherein the coupling mechanisms are provided at all vertexes of the second partial support plates that are provided above the first support plate.

18. A vacuum adiabatic body comprising:
a first plate
a second plate;
a vacuum space provided between the first plate and the second plate;
a support configured to maintain a distance between the first and second plates, the support being disposed next to or adjacent to the first plate, including:
 a first support plate configured to support the first plate;
 a second support plate configured to support the second plate;
 at least one coupling mechanism configured to secure the first support plate to the second support plate at at least one position; and
 a plurality of seating mechanisms configured to maintain a distance between the first support plate and the second support plate,
wherein the seating mechanisms do not secure the first and second support plates to each other, and
wherein the at least one coupling mechanism includes:
 a pressing opening provided in the second support plate;
 a coupling boss provided on the first support plate; and
 a coupling bolt configured to have a first end inserted into and supported by an inner surface of the pressing opening and a second end coupled to the coupling boss.

19. The vacuum adiabatic body according to claim 18, wherein the second end of the coupling bolt is fitted within the coupling boss.

* * * * *